July 4, 1950 D. L. PUNSKY 2,514,089
POWER SHAFT SHIELD
Filed March 21, 1945
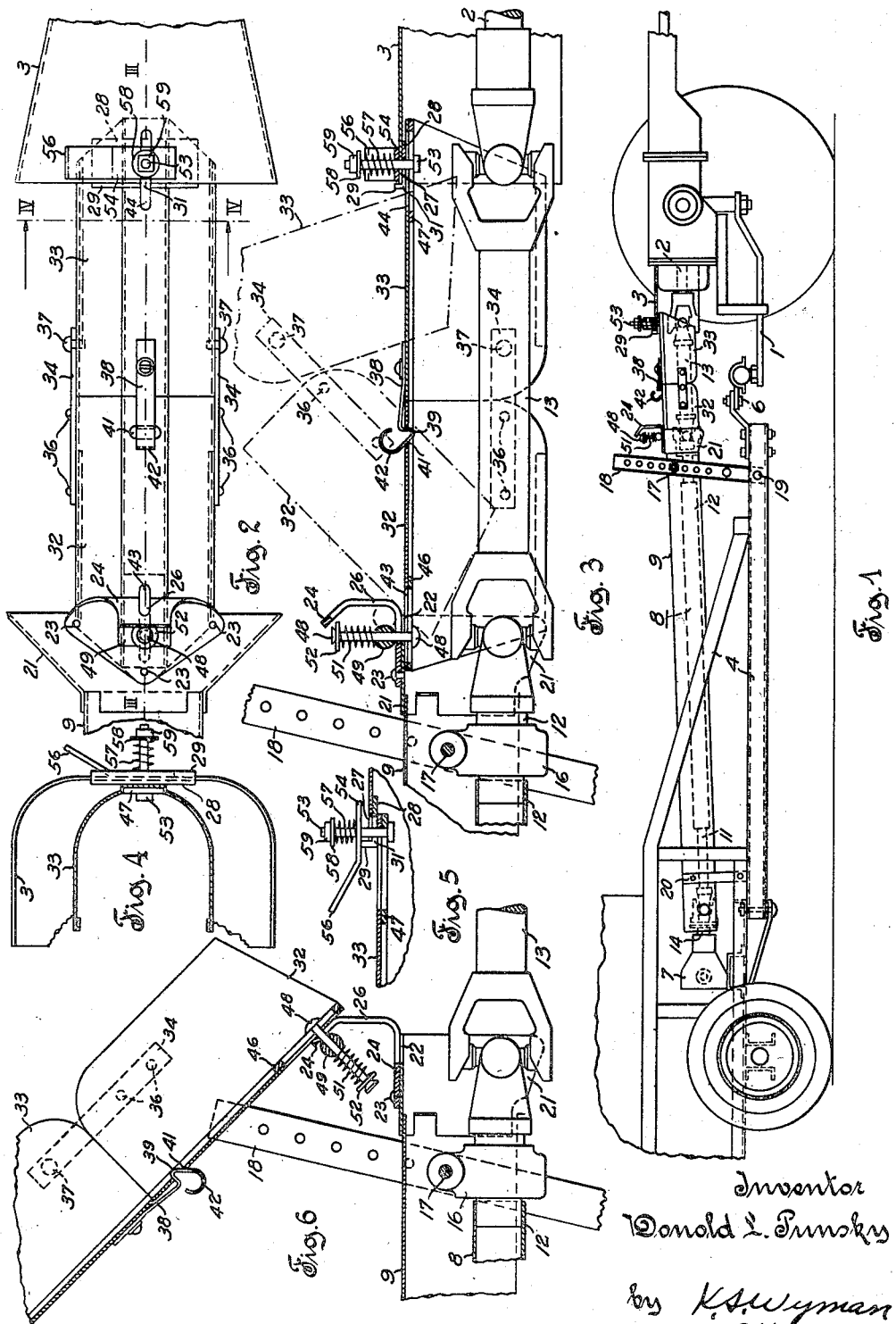
Inventor
Donald L. Punsky
by K. S. Wyman
Attorney Patented July 4, 1950

2,514,089

UNITED STATES PATENT OFFICE 2,514,089

POWER SHAFT SHIELD

Donald L. Punsky, La Porte, Ind., assignor to Allis-Chalmers Manufacturing Company, Milwaukee, Wis., a corporation of Delaware Application March 21, 1945, Serial No. 584,011

11 Claims. (Cl. 64—3)

This invention relates generally to the mechanical transmission of power and more particularly to a shield construction for the exposed, detachably connected ends of power transmitting shafts.

The invention is particularly applicable, although in no manner limited, to the mechanical transmission of power from a prime mover on a suitable draft means (hereinafter called tractor) to a power driven apparatus on a tractor propelled vehicle, machine, implement, or the like (hereinafter called vehicle) irrespective of whether the vehicle is disposed behind, alongside, or ahead of the tractor. In this connection, the vehicle is generally provided with a suitably projecting draft frame or gear having a hitch part adapted for connection with a tractor drawbar or other draft member, and the tractor end of the power transmitting shaft is usually supported in a bearing which is in turn suitably mounted on the draft frame adjacent the hitch part thereof, the shaft extending beyond the bearing and terminating in a short, universally connected portion having a detachable power take-off shaft connection universally coupled to its tractor end. Most constructions of this type include a main shield structure partially enclosing the bearing and all or a major portion of that part of the power shaft which extends from the bearing to a point adjacent the power driven apparatus on the vehicle, and some constructions include in addition, a short detachably mounted front shield which extends from the tractor end of the main shield to the adjacent end of a tractor mounted, power take-off shaft shield.

The provision of a front shield for the universally coupled, tractor end of the power transmitting shaft is desirable in order to prevent injury to the operator or any other person having occasion to step over or work around the hitch part of the draft frame or the tractor end of the power shaft when the latter is rotating, and it is also desirable to provide a detachable mounting for the front shield permitting removal of same in order to lubricate or otherwise service the universal couplings and in order to facilitate connecting and disconnecting the adjacent ends of the power transmitting and tractor take-off shafts. However, irrespective of the ease with which the front shield can be removed and replaced, it frequently happens that once the front shield is removed it is never replaced, presumably due to haste, carelessness or intentional forgetfulness on the part of the operator, and as a result, sooner or later someone is injured while stepping over or working in the immediate vicinity of the tractor end of the power transmitting shaft.

It is therefore an object of this invention to provide a power transmitting shaft and main shield combination with an additional shield structure embodying an improved construction and mounting permitting same to be readily swung into and out-of a shaft covering, extension-forming position with respect to the main shield.

Another object of this invention is to provide the detachably connected ends of power transmitting shafts having a pair of shields disposed in spaced opposed, shaft exposing relation with respect to such ends with an improved additional shield structure nondetachably mounted and selectively positionable to effectively cover or to effectively expose the detachably connected end portions of the shafts.

Another object of this invention is to provide an improved shield construction for the power take-off end of a power transmitting shaft operatively connecting power driven apparatus with a prime mover actuated power take-off shaft in which the shield is nondetachably mounted and selectively positionable to effectively cover the power take-off end portion of the power transmitting shaft or to effectively expose same for the ready performance of servicing, connecting and disconnecting operations.

Another object of this invention is to provide a shield construction for the detachably connected, exposed ends of power transmitting shafts which is adapted to close the gap between the spaced opposed ends of the conventional shields for such shafts, and which is nondetachably, pivotally mounted on one of said shields for swinging movement into and out of a gap closing, shaft covering position between same.

Still another object of this invention is to provide an improved shield construction for the power take-off end of power transmitting shafts of the type herein specified which is adapted to close the gap between the spaced opposed ends of the main and power take-off shaft shields, and which includes a pair of pivotally joined sections nondetachably interconnected and pivotally mounted on one of said shields for swinging movement into and out of an alined gap closing, shaft covering position with the remote ends of the pivotally joined sections disposed in telescoping relation within the spaced opposed ends of the main and power take-off shaft shields.

A further object of this invention is to provide a nondetachably mounted, durable shield construction for the exposed, detachably connected ends of power transmitting shafts which is inexpensive to manufacture and install, and which can be readily positioned to either shield or expose the shaft as desired with a minimum of time and effort.

The significance of the aforementioned and other objects, and the construction, application and operation of apparatus embodying the invention will become readily apparent as the disclosure progresses and particularly points out the features of special importance. And accordingly the invention may be considered as consisting of the various details of construction, combinations of elements, and arrangements of parts as is more fully set forth in the appended claims and in the detailed description, reference being had to the accompanying drawing, in which:

Fig. 1 is a side elevation, illustrating in part, a tractor drawn vehicle combination embodying the invention;

Fig. 2 is an enlarged plan view of the front shield construction shown in Fig. 1;

Fig. 3 is a section taken on line III—III of Fig. 2;

Fig. 4 is a section taken on line IV—IV of Fig. 2;

Fig. 5 is an enlarged detail of the releasable latch for securing the front shield to the tractor power take-off shield; and Fig. 6 is a view similar to Fig. 3 illustrating the shield in its shaft exposing position.

Referring to Fig. 1 of the drawing, it is seen that the invention is illustrated as applied to a wheel-supported, tractor-drawn vehicle combination including a drawbar 1, a power take-off shaft 2 provided with a shield 3, a draft frame 4 having a hitch part 6 detachably connected with drawbar 1, a power driven apparatus 7, a power transmitting shaft 8 operatively connecting power take-off shaft 2 with power driven apparatus 7, and a main shield 9 partially enclosing shaft 8 and terminating in spaced opposed relation with respect to rear end of power take-off shield 3.

Power shaft 8 comprises telescoped main sections 11 and 12 and a universally connected front section 13. The rear end of section 11 is universally connected with and supported by a forwardly extending stub shaft 14 of driven apparatus 7, and the forward end portion of intermediate section 12 is supported in a bearing 16 mounted on a horizontal pivot pin 17 carried by a pair of standards 18 which are in turn supported on the forward end of draft frame 4 by means of a pivot pin 19 permitting the standards to swing longitudinally relative to the draft frame. The forward end of front section 13 is universally detachably connected with power take-off shaft 2. Main shield 9 has its rear end portion supported by a pair of pivotally mounted standards 20 and has its forward end portion similarly supported by the standards 18, the forward end of the shield extending beyond the standards and terminating in a laterally flared end portion 21 (see Fig. 2) which is disposed in longitudinally spaced opposed relation with respect to the somewhat similarly flared end portion of power take-off shield 3.

Referring more particularly to Figs. 2, 3 and 6, it is seen that the top of main shield end-portion 21 has an elongated opening 22 therethrough which extends rearward from the front edge thereof, and has fixedly secured thereto, as by means of rivets 23, the base portion of an immovable hinge member 24 having an intermediate portion which extends upwardly at a right angle with respect to its base portion, having an outer end portion which extends upward and rearward with respect to its intermediate portion, and having a slot 26 therethrough which is alined with the opening 22 in the end portion 21 of main shield 9 and extends to a point adjacent the outer edge of its outer end portion. The top rear portion of power take-off shield 3 has an elongated opening 27 therethrough which extends forward from the rear edge thereof, and has fixedly secured to the inner or underside thereof, a reinforcing plate 28 having its rear edge terminating in an upturned lip or flange 29 which extends outward beyond the top surface of the shield, and having an opening 31 therethrough which is similar to and alined with the opening 27 in the shield 3 and extends through the lip or flange 29 as is best shown in Fig. 5.

Referring again to Figs. 2 and 3, it is seen that the gap between the flared, spaced opposed ends of main shield 9 and power take-off shield 3 is closed by a front shield structure comprising a pair of sections 32, 33 nondetachably joined for relative pivotal movement into and out of the dotted and full line positions shown in Fig. 3 by means of a pair of parallel side straps or bars 34 fixedly secured to opposite exterior side portions of section 32 by rivets 36 and pivotally connected with opposite exterior side portions of section 33 by pivot pins or the like 37, the sections being maintained in the end-abutting, alined relation shown in full lines in Fig. 3 by means of a spring latch 38 which is secured to the upwardly offset, flat top portion of section 33 (see Fig. 4) and extends over and along the similarly offset, flat top portion of section 32 with its downwardly offset end 39 disposed in latched engagement with the edge of a recess or opening 41 in the flat top portion of section 32. The offset end 39 of latch 38 preferably includes an upwardly bent portion providing a finger grip 42 which can be readily grasped when it is desired to release the latch. The lower portions of the end abutting edges of sections 32 and 33 are cut away on a radius in order to permit section 33 being swung relative to section 32 and positioned as shown in dotted lines in Fig. 3.

The remote ends of the flat top portions of sections 32 and 33 are provided with alined, longitudinally extending slots 43 and 44, respectively, and are reinforced by means of similarly slotted straps or bars 46 and 47 secured to the underside of the grooved, top surfaces of sections 32 and 33 with the slot in each bar disposed in coextensive alinement with the overlying slot in the section to which the bar is secured. The slotted end of section 32 is nondetachably secured to the end 21 of main shield 9 by means of a rivet or like element 48 which passes through the alined slots in reinforcing bar 46 and section 32, through the slot 26 in immovable hinge member 24, through a transversely disposed cylindrical pivot block 49, through a compression spring 51, and through a spring seat or washer 52 which is held on element 48 by the enlarged outer end thereof. The inner enlarged end of element 48 is held in engagement with the underside of reinforcing bar 46 by the action of spring 51 which also acts to maintain pivot block 49 in continuous engagement with hinge member 24. The slotted end of section 33 is provided with a latch means which is adapted to releasably secure this section to power take-off shield 3, the latch means comprising a bolt or the like 53 which passes through the alined slots in reinforcing bar 47 and section 3, through an apertured bar 54 having an upturned end portion 56, and through a compression spring 57 which is interposed between the horizontal portion of bar 54 and a spring seat or washer 56 held on the outer end of bolt 53 by its nut 59. Spring 57 acts to maintain the headed end of bolt 53 in engagement with the underside of reinforcing bar 47, and to maintain the horizontal portion of bar 54 in engagement with the flat top side of power take-off shield 3 and in edge abutting engagement with the upturned lip or flange 29 as is shown in Figs. 2 and 3.

It should now be obvious that with the various parts positioned as shown in Figs. 2 and 3, latch bar 54 may be lifted upward against the compressive force of spring 57 and turned to the position shown in Fig. 5, either before or after the alined sections 32 and 33 have been shifted bodily rearward to the extent indicated in Fig. 5, and that when the parts are so positioned, the bolt 53 and latch bar 54 may be shifted rearward relative to power take-off shield 3 and relative to section 33 until bar 54 is free of lip or flange 29 and rests directly on the upwardly offset flat top portion of section 33. It should also be obvious that sections 32 and 33 can be readily shifted bodily rearward when latched in the alined relation shown in Figs. 2 and 3 simply by grasping the finger grip portion 42 of latch 38 with one hand and pulling rearward and at the same time using the other hand to lift and turn latch member 54 to the position shown in Fig. 5. In addition, it should be noted that the rear end of section 32 can be pressed downward against the action of spring 51 and slid beneath the overlapped portions of main shield 9 and the end portion 21 thereof.

After the alined sections have been slid rearward to the extent or nearly to the extent permitted by their slotted end portions (slots 43, 44) and the latch member 54 is resting on the flat top portion of section 33, all that has to be done in order to position sections 32 and 33 as indicated in Fig. 6 is to disengage the portion 39 of latch 38 from recess 41 and pull up on the grip portion 42 thereof which causes section 32 to move forward and pivot relative to fixed hinge member 24 and section 33 to pivot or swing relative to section 32 until the various parts are positioned as indicated in dotted lines in Fig. 3 whereupon a continued upward pull on grip portion 42 causes pivot block 49 to move outward along fixed hinge member 24 to the position shown in Fig. 6. Obviously, sections 32 and 33 may be brought into and latched in alinement any time after the end of section 33 clears the rear end of power take-off shield 3. When it is desired to again close the gap between the spaced opposed ends of main shield 9 and power take-off shield 3, all that has to be done is to reverse the procedure just described, i. e., to bodily swing and break the sections to position same as shown in dotted lines in Fig. 3, whereupon the sections can be pushed downward and rearward into alined relation and then slid forward, lifting the latch member 54 over the flange or lip 29 and turning same into its latched full line position shown in Fig. 3. Latch 38, when released, snaps into the recess 41 in section 32 as soon as the sections 32 and 33 are disposed in alinement to lock same in the alined relation shown in Figs. 2, 3 and 6.

It should now be obvious that sections 32 and 33 are nondetachably joined for relative pivotal movement, that section 32 is nondetachably supported on portion 21 of main shield 9 for sliding, pivotal movement relative thereto, and that the sections 32 and 33 can be readily, bodily shifted longitudinally and swung into and out-of a gap closing, shaft covering position with respect to the shields 3 and 9 and the shaft section 13 with the remote ends of the sections disposed in partially telescoped relation within the adjacent end portions of the shields 3 and 9. In this connection, the sections 32 and 33 are preferably similar and of generally U-shaped cross section with their top surfaces offset, as best indicated in Fig. 4, in order to strengthen same and in order to facilitate attachment of the reinforcing bars 46, 47 and the mounting of latch 38. In addition, the sides of the remote end portions of the sections may be cut away, i. e., toward the end abutting portions of same, as is clearly indicated in Figs. 3 and 6. However, the shape and construction of the sections 32 and 33 may be varied as desired, and although it is preferred to employ channel-forming sections of generally U-shaped cross section, it should be understood that the sections need not be channel or trough-shaped in cross section.

The invention is generally applicable to partially shielded power transmitting shafts having one end exposed and detachably connected with either a driving or a driven shaft, and although the invention has been shown and described as applied to the driving shaft combination, it should be further understood that it is not intended to limit the invention to the exact details of construction, combinations of elements and arrangements of parts herein shown and described, for purposes of illustration, as various modifications within the scope of the appended claims may occur to persons skilled in the art.

It is claimed and desired to secure by Letters Patent:

1. In a combination including a power transmitting shaft and a main shield therefor leaving exposed an end portion of said shaft, an additional shield for the exposed end portion of said shaft comprising a pair of channel-forming sections nondetachably joined for relative pivotal movement, a latch means for releasably retaining said sections in substantially alined relation, a supporting part adjacent to the exposed end of said shaft, and means nondetachably mounting said joined sections on said part for bodily swinging movement into and out-of a position in which the sections are disposed in alined extension forming relation with respect to an end of said main shield and in covering relation with respect to said exposed end portion of said shaft.

2. In a combination including a power transmitting shaft and a main shield therefor leaving exposed an end portion of said shaft, an additional shield for the exposed end portion of said shaft comprising a pair of channel-forming sections nondetachably joined for relative pivotal movement, a supporting part adjacent to the exposed end of said shaft, and means nondetachably mounting said joined sections on said part for bodily swinging movement into and out-of a position in which the sections are alined in shaft shielding extension forming relation with respect to an end of said main shield with the end of the adjacent one of said sections disposed in partially telescoped relation within said end of the main shield.

3. In a combination including a power transmitting shaft and a pair of shields therefor disposed in spaced, shaft exposing relation, an additional shield structure adapted to close the gap between said spaced shields comprising a pair of channel-forming sections nondetachably joined for relative pivotal movement, a supporting part adjacent the exposed portion of said shaft, and means nondetachably mounting said joined sections on said part for bodily swinging movement into and out-of a position in which the joined sections are in substantial alinement and disposed in gap closing partially telescoped relation within the opposed end portions of said spaced shields.

4. A shield structure adapted to be disposed in gap closing, partially telescoped relation with respect to a pair of shields disposed in spaced, shaft exposing relation comprising a pair of similar channel-forming sections nondetachably joined for relative pivotal movement, a supporting part, means nondetachably mounting an end portion of one of said sections on said part for bodily swinging said nondetachably joined sections relative to said support and into and out of a position in which said sections are in substantial alignment, and a latch means on said sections for releasably retaining same disposed in substantially alined relation.

5. In a combination including a power take-off shaft, a shield for said power take-off shaft, a power transmitting shaft detachably connected with said power take-off shaft, and a main shield for said power transmitting shaft disposed in spaced, gap forming relation with respect to said power take-off shield, a front shield comprising a pair of sections nondetachably joined for relative pivotal movement and a latch means for releasably retaining said sections in substantial alinement, and means nondetachably mounting said front shield on one of said other shields for swinging movement into and out of a position in which said sections are in substantial alinement and disposed in gap closing, partially telescoped relation with respect to said other shields.

6. In a combination including a power transmitting shaft comprising telescoped sections, a bearing structure supporting one of said sections for limited longitudinal movement relative to the other section, said one section extending beyond said bearing structure and terminating in a part adapted for detachable connection with a power take-off shaft, and a main shield for said power transmitting shaft supported in part by said bearing structure and extending beyond same to a point longitudinally spaced from the power take-off of said one section, a front shield comprising a pair of sections nondetachably joined for relative pivotal movement and a latch means for releasably retaining the section in substantial alinement, and means nondetachably mounting said front shield for bodily swinging same into and out of a position in which the sections are in substantial alinement with the remote end of one section disposed in telescoped relation with respect to the adjacent end of said main shield.

7. In a combination including a pair of detachably connected power transmitting shafts and a pair of shields disposed in spaced opposed, shaft exposing relation with respect to the connected ends of said shafts, an additional shield comprising a pair of sections nondetachably joined for relative pivotal movement and a latch means for releasably retaining said sections in substantial alinement, and means nondetachably mounting said additional shield on an end portion of one of said pair of shields for sliding and swinging movement into and out-of a position in which said sections are in substantial alinement and disposed in gap closing, partially telescoped relation within the opposed end portions of said pair of shields.

8. In a combination including a power transmitting shaft having a universally coupled end extension thereof adapted for connection with a power take-off shaft, a shield for said end extension comprising a pair of channel forming sections nondetachably joined for relative pivotal movement, a support adjacent said shaft extension, and means nondetachably mounting said sections on said support for bodily swinging movement into and out of a position in which said members are disposed in alined covering relation with respect to said shaft extension.

9. In a combination including power transmitting shafting having detachably coupled sections, a shield for the junction of said sections comprising a pair of channel-forming inverted trough-like members nondetachably joined for relative pivotal movement, a support adjacent the junction of said sections, and means nondetachably mounting said trough-like members on said support for bodily swinging movement into and out of a position in which said members are disposed in alined covering relation with respect to the junction of said sections.

10. In a combination including power transmitting shafting having detachably coupled sections, a shield for the junction of said sections comprising a pair of channel-forming inverted trough-like members nondetachably joined for relative pivotal movement, a support adjacent the junction of said sections, means nondetachably mounting said trough-like members on said support for bodily swinging movement into and out of a position in which said members are disposed in alined covering relation with respect to the junction of said sections, and a latch means for releasably retaining said members in alined channel-forming relation.

11. In a combination including a pair of detachably connected power transmitting shafts and a pair of shields disposed in spaced opposed, shaft exposing relation with respect to the connected ends of said shafts, an additional shield comprising a pair of sections nondetachably joined for relative pivotal movement, a latch means for releasably retaining said sections in substantial alinement, and means nondetachably mounting said additional shield adjacent the detachably connected ends of said shafts for sliding and swinging movement into and out of a position in which said sections are in substantial alinement and disposed in gap closing, partially telescoped relation within the opposed end portions of said pair of shields.

DONALD L. PUNSKY.

REFERENCES CITED

The following references are of record in the file of this patent:

UNITED STATES PATENTS

| Number | Name | Date |
|---|---|---|
| 781,243 | Thompson | Jan. 31, 1905 |
| 1,247,723 | Rost | Nov. 27, 1917 |
| 1,322,335 | Peterson | Nov. 18, 1919 |
| 1,455,493 | John | May 15, 1923 |
| 1,765,188 | Webb | June 17, 1930 |
| 1,832,991 | Levin | Nov. 24, 1931 |
| 2,349,923 | Anderson et al. | May 30, 1944 |
| 2,443,035 | Hardy | June 8, 1948 |